United States Patent [19]

DeWitt, III

[11] 4,107,235

[45] Aug. 15, 1978

[54] HIGH IMPACT RESISTANT ACRYLIC COATING COMPOSITIONS AND COATED ARTICLES

[75] Inventor: Walter Groesbeck DeWitt, III, Southampton, Pa.

[73] Assignee: Rohm and Haas Company, Philadelphia, Pa.

[21] Appl. No.: 844,011

[22] Filed: Oct. 20, 1977

Related U.S. Application Data

[63] Continuation-in-part of Ser. No. 352,157, Apr. 18, 1973, abandoned.

[51] Int. Cl.$^2$ .......................... C08K 5/01; C08K 5/05; C08K 5/07; C08K 5/10
[52] U.S. Cl. ........................ 260/876 R; 260/29.6 RB; 260/29.6 T; 260/31.2 R; 260/31.4 R; 260/32.8 R; 260/33.4 R; 260/33.6 UA; 260/885; 260/901; 428/500; 428/515
[58] Field of Search ........... 260/885, 876 R, 33.6 UA, 260/901

[56] References Cited

U.S. PATENT DOCUMENTS

3,475,516   10/1969   Bauer et al. .......................... 260/885

OTHER PUBLICATIONS

Modern Plastics Encyclopedia, 1968, McGraw-Hill Pub. Co., N.Y. NY, Sep. 1967, p. 495.

*Primary Examiner*—Carman J. Seccuro
*Attorney, Agent, or Firm*—Lester E. Johnson; Michael B. Fein

[57] ABSTRACT

Coating compositions comprising an acrylic solution polymer having a molecular weight of about 30,000 to 250,000 and a Tg above 65° F., a solvent therefor, and a compatible acrylic polymer having a Tg less than −20° F., which is soluble in the same solvent, coated substrates, and especially coated impact-modified acrylic sheets having improved resistance to impact.

4 Claims, No Drawings

HIGH IMPACT RESISTANT ACRYLIC COATING COMPOSITIONS AND COATED ARTICLES

This is a continuation-in-part of copending application U.S. Ser. No. 352,157, filed Apr. 18, 1973, now abandoned.

This invention relates to coating compositions. More particularly, this invention relates to improved acrylic paint binders for high impact thermoplastic substrates.

A recent development has been high impact resistant acrylic thermoplastic sheets or other articles which are thermoformable, rigid materials exceptionally resistant to weathering. The high resistance to impact is the result of an impact modifier included in the acrylic sheet, and provides the desirable utility of vandal-proof signs, glazing and other articles which do not crack when attacked by rocks or other missiles.

Sign faces are typically thermoformed from acrylic sheet either before or after back-painting. The paint coating compositions known heretofore drastically embrittled the sign face when an object struck the front or outside surface due to the back side, i.e., the painted side, being put in tension, resulting in drastic loss of impact strength.

Bonsignore in U.S. Pat. No. 3,653,950 has previously suggested a polyurethane primer to be applied to the high impact resistant thermoplastic substrate prior to painting with conventional acrylic coatings. The Bonsignore system did solve the problem of embrittlement with spray paint systems, but an alternative approach without the necessity of a separate primer coat step became desirable. Another disadvantage of the Bonsignore system was poor weathering properties due to the polyurethane.

It is an object of this invention to provide coating compositions for high impact thermoplastic substrates which are non-embrittling and can be applied in a single operation. It is a further object to provide painted high impact thermoplastic articles which retain their impact resistance.

These and other objects as will become apparent from the following disclosure are achieved by the present invention which comprises a composition for coating a substrate comprising an acrylic solution polymer having a molecular weight of about 30,000 to 250,000 and a $T_g$ above 65° F., a solvent therefor, and a compatible acrylic polymer having a $T_g$ of less than $-20°$ F. and soluble in the solvent. Also, the coated substrates are part of the invention, particularly painted impact-modified acrylic sheets characterized by improved resistance to impact. The invention provides impact-resistant weatherable coated substrates. The coating does not diminish the impact resistance of acrylic sheet substrates and is especially useful for back-painting impact-resistant sign faces. In many cases the coating compositions of the invention improve the impact resistance of acrylic sheet substrates, whereas the coating systems of the prior art very substantially diminish the impact resistance of acrylic sheets.

The substrates to be coated are any which would benefit by high impact resistance in the coating, for example metal subject to changing temperature conditions, wood, plastics, etc. Thermoplastic sheet, and especially acrylic sheet, benefits very much from these coating compositions.

Impact-modified acrylic sheet is the most preferred substrate to be coated by the compositions, particularly the sheet containing polyurethane elastomers described by Niederhauser et al in U.S. Pat. No. 3,641,199 and the sheet containing impact modifiers, such as the multi-stage sequentially produced polymers characterized by a non-elastomeric hard firststage, and intermediate elastomeric stage, and a final relatively hard stage described by Owens in U.S. Ser. No. 196,194 of Nov. 5, 1971.

Typically, signs are thermoformed acrylic sheet which has been back-painted either before or after thermoforming. Conventional paints are based on acrylic solution polymers having molecular weights of about 30,000 to 250,000 and $T_g$ above 65° F. in a solvent carrier, with pigments included. The method of application is most frequently by spraying the coating on the sheets or by silk screen process.

The coating composition of the invention comprises these conventional acrylic solution polymers and solvents, and furter includes the previously mentioned compatible acrylic polymers. The glass transition temperature, $T_g$, of the compatible polymers is below $-20°$ F., preferably $-25°$ F. to $-45°$ F. They are substantially non-cross-linked, polymerized from a monomer system containing less than 1% by weight polyethylenically unsaturated monomer, preferably no such crosslinking monomer, and preferably are prepared by emulsion polymerization techniques.

For compatible polymers whose molecular weight can be measured, the molecular weight is above 500,000, preferably above 1,500,000; the compatible polymers are substantially more viscous than the acrylic solution polymers, and have not previously been employed in prior art coating compositions based on acrylic solution polymers.

By compatible is meant that when examined by optical microscope, the three component system, i.e., the acrylic solution polymer, solvent system, and compatible acrylic polymer, appears single phase, or essentially single phase, i.e., hazy. The latter phenomenon occurs when the polymer level of the solution is above the capacity of the solvent to fully dissolve both the solution polymer and compatible polymer.

Suitable monomer systems are those which yield a polymer having a $Tg$ below $-20°$ F. which is soluble in the solvent to be employed in the coating composition. These monomers are selected from lower alkyl acrylate, alkoxyalkyl acrylates, and alkoxythioalkyl acrylates, optionally including other monoethylenically unsaturated monomers such as vinyl chloroacetate or cyanoalkyl acrylate monomers, and less than 1% polyethylenically unsaturated monomers such as butylene diacrylate. The compatible acrylic polymers can be polymerized in one, two, or more stages, with the above mentioned molecular weight measured as the sum of the molecular weights of the stages in the case of multiple stage polymers. These compatible polymers can be prepared by any process by which the desired molecular weight is achievable, for example suspension or emulsion, with the latter method preferred. It has been found to be an advantageous method to prepare the compatible acrylic polymers in an emulsion by charging the reactants together with water, an emulsifier, catalyst or initiator, and a buffer if needed, into a suitable reaction vessel, including a chain regulator to control the molecular weight, and in the case of multi-stage polymers to control the molecular weight of each stage, and then, rather than coagulating the resultant polymer in the aqueous dispersion, combining the polymer dispersion with the solution of the acrylic solution polymers. If the solvent is non-aqueous, the water from the dispersion is distilled off, resulting in coating compositions of the invention. If the solvent is water, no further distillation is necessary, unless it is desired to adjust the concentration.

The solvent in the compositions can be water but is preferably organic, for example aromatic hydrocarbons such as toluene, xylene, and the like; esters, ketones, and alcohols such as n-butyl acetate, methyl ethyl ketone, isopropyl alcohol, cyclohexanone, 2-ethoxyethyl acetate, diisobutyl ketone, and the like; aliphatic hydrocarbons such as heptane, octane, cyclohexane, and the like. Mixtures of two or more solvents are preferred. Sufficient solvent is included to dissolve the acrylic solution polymer and optionally dissolve the compatible acrylic polymer. In some embodiments the composition is hazy i.e., there is insufficient solvent to fully dissolve the compatible acrylic polymer, while in other more preferred embodiments the composition is clear. The amount of solvent is selected to achieve the desired viscosity for application to the substrate, and for different pigments and different formulations the amount can vary. Preferably the solvent to solids weight ratio is about 95:5 to 30:70, with the lower amounts of solvent preferred for silk screen applications and the higher amounts for spray applications systems.

The acrylic solution polymers may be those which are well known in the coatings art, having a molecular weight of about 30,000 to 250,000, preferably about 80,000 to 130,000 and a $T_g$ above 65° F. and polymerized from a monomer or monomer mixture comprising lower alkyl methacrylates, lower alkyl acrylates, and optional minor amounts of other ethylenically unsaturated monomers, such as acrylic or methacrylic acid. The solution polymer is preferably made by a single stage polymerization technique, although two-stage systems may be used. The preferred method of preparation is the conventional solution polymerization technique wherein the monomer system is dissolved. In an organic solvent such as toluene, xylene, ethylene glycol, mixtures of solvents, and the like, polymerized, and optionally either isolated and redissolved in the solvent coating composition or used as is. An alternative method of preparing the solution polymers is by a controlled emulsion or dispersion technique with the appropriate molecular weight controller being employed; although such a method does not produce a "solution" polymer, the term is applied to such low molecular weight polymers in this application for convenience. Exemplary monomer systems are 73 weight parts ethyl methacrylate, 26 methyl acrylate, and 1 methacrylic acid; 61 butyl methacrylate, 38 methyl methacrylate, 1 methacrylic acid; 55 methyl methacrylate, 45 ethyl acrylate; 61 methyl methacrylate, 9 butyl methacrylate, 24 butyl acrylate, 6 methacryloxyisopropyl acid phthalate.

The typical weight ratios of acrylic solution polymer to compatible acrylic polymer are about 10:1 to 1:10, preferably 8:2 to 6:4. When too high a ratio of compatible polymer is included, the coating becomes too soft when applied, i.e., is tacky. When too low a ratio of compatible polymer is included, the increase in impact resistance is insignificant.

Typical formulations can include any of a wide variety of pigments, mildewcides, leveling agents, dispersing acids, and other additives used in paints.

The substrate can be coated with brush, roller, dipping, padding or knife methods, but silk screen and spraying are the preferred methods.

While the following examples illustrate several embodiments of the invention, they should not be construed as limiting in any way. All parts and percentages are by weight unless noted otherwise.

EXAMPLE 1

This example illustrates the preparation of a compatible acrylic polymer having a $T_g$ less than $-20°$ F. and soluble in the solvent of the coating composition.

The following ingredients are charged to a reaction flask:

First Stage Charge 840 ml. deionized water
19 ml. of 1% aqueous potassium carbonate
126 ml. of 10% sodium dodecylbenzenesulfonate[1](SDBES)
333.9 grams n-butyl acrylate
113.4 grams 2-methoxyethyl acrylate
25.2 grams 2-cyanoethyl acrylate
9.5 grams vinyl chloroacetate
0.12 grams t-dodecyl mercaptan
1.42 grams diisopropyl benzene hydroperoxide[2](54% assay) (DIBHP)

Agitation is started, the temperaure adjusted to 30° C., and the emulsion sparged with nitrogen after which polymerization is initiated by addition of 30 ml. of 1% sodium sulfoxylate formaldehyde[1](SSF). The reaction mixture is heated to 80° C. and an additional 5 ml. of SSF are added. Thereafter, the following second-stage ingredients are pre-emulsified and added gradually to the reaction flask containing the reactive first-stage charge:

Second Stage Charge 157.5 grams ethyl acrylate
3.1 grams vinyl chloroacetate
0.5 grams DIBHP
31 ml. 10% SDBES
100 ml. of deionized water The addition is completed in three hours at 80° C. The latex at 35.7% solvent had a viscosity of 38 cps, a pH of 2.6, a Vistex of 1.3 in acetone at 30° C., and a $T_g$ (if measured after isolation) of $-40°$ F.

1. Aqueous
2. In a mixture of diisopropyl benzene, isopropyl acetyl acetophenone, and dimethyl isopropyl phenyl carbinol

EXAMPLE 2

This example illustrates the preparation of a coating composition of the invention. To a conventional solution polymer copoly(ethylmethacrylate/methylacrylate/methacrylic acid) 73/26.0/1 in a solvent which is a mainly aromatic petroleum fraction boiling between 155–185° C. (Solvesso 100) in the ratio of 75 weight parts solution polymers to 262 weight parts solvent is added 107 weight parts of the emulsion prepared in Example 1 at 70° C. The water from the emulsion is then distilled at 95° C. over one hour followed by light vacuum at 105° C. to remove the last traces of water. The weight ratio of compatible acrylic polymer prepared as in accordance with Example 1 to the total polymer, i.e., acrylic solution polymer and compatible acrylic polymer, is 0.33.

EXAMPLE 3

The coating composition prepared in accordance with Example 2 is thinned to spray viscosity (10–20 Sec., No. 4 Ford Cup) by addition of solvent and sprayed on a sheet of impact-modified poly(methyl methacrylate), the impact modifier being a polyurethane polymer, sold under the trademark Plexiglas 70. The wet film thickness is 4.5 ml. and the coated sheet is treated for thirty minutes at 180° C. The impact resistance values of the coated and uncoated acrylic sheet is determined by a variable height impact tester (VHIT) from Gardner Laboratories, Bethesda, Md. Impact resistance results are evaluated by the "Staircase Method of Sensitivity Testing," NAVORD Report 65–46, Method 4. The values are determined by impact on the unpainted side of the sheet, i.e., with the paint in tension. A 50% failure value was determined from greater than 10 impact hits. The VHIT impact strength for both sheets is determined to be 150 in.-lbs., showing that the coating did not reduce the impact strength. For comparative purposes the composition of Example 2 is prepared except that no compatible acrylic polymer is included (a conventional coating composition). The VHIT impact strength was less than 10 in.-lbs., showing very substantial loss of impact strength for impact-modified acrylic sheets coated with a conventional coating composition.

EXAMPLE 4

Example 3 is repeated except for the incorporation of 15 parts of Heliogen Blue pigment having been dispersed in 283 parts of the coating composition by ball milling. Again, the VHIT impact strength is not diminished by the coating compo- of the invention.

EXAMPLE 5

The coating composition of Example 4 is applied to wood, metal and other plastics.

EXAMPLE 6

The coating composition of Example 2 is prepared except that instead of employing the compatible acrylic polymer of Example 1, a polybutyl acrylate having a $T_g$ of −25° F. is substituted. The VHIT impact strength is substantially higher than the equivalent sheet with conventional coating compositions, i.e., the analogous composition without the polybutyl acrylate. The flatwise Izod Impact Resistance is between 43 and 35, while the control (uncoated) sheet is 37.

EXAMPLE 7

To 183 parts of the coating composition of Example 2 is added 45 parts TiO$_2$ pigment. The resulting composition is applied to a sheet of poly(methyl methacrylate) containing a three-stage graft polymeric impact modifier of the composition butyl acrylate/styrene/ethylthioethyl methacrylate/butylene diacrylate/allyl methacrylate//styrene/butyl acrylate/divinyl benzene/allyl methacrylate//methyl methacrylate/styrene/methyl acrylate in the ratios 31/5/0.5/0.2/0.1//29/5/0.5/0.1//18/11/1. The VHIT is measured at 85 in.-lbs. as compared to an uncoated sheet of the same material whose VHIT is measured at 45 in.-lbs., showing a substantial improvement in impact resistance by virtue of the coating composition of the invention.

EXAMPLE 8

The composition of Example 2 is prepared except for the solution polymer used therein. The following solution polymer is substituted: copoly(butyl methacrylate/methyl methacrylate/methacrylic acid) 61/38/1. To 183 parts of the above composition is added 45 parts of TiO$_2$ white pigment. This pigmented coating is sprayed on a polyurethane modified poly(methyl methacrylate) sheet, baked at 180° C. for 30 minutes and does not significantly reduce the impact properties of the sheet; the uncoated sheet has a VHIT value of 95 in.-lbs. as compared to the VHIT value of 90 in.-lbs. for the coated sheet.

EXAMPLE 9

The composition of Example 8 is cut to the 20% solids level with additional solvent before introducing pigment, which in this example is Heliogen blue after which the pigment was dispersed by two passes on a three roll mill at 50 pounds to give a Hehman gauge fineness of grind measurement of 7 to 8 units. The resultant paint was silk screened on 0.125 inch Plexiglas 70 acrylic sheet to give the following properties after baking at 170° C. for 10 minutes.

VHIT Impact Strength (Paint in Tension) 125 in.-lbs. uncoated control >120 in.-lbs.

Microknife Adhesion = 1/A = 0.19 Equivalent sheet silk screened with a commercial acrylic base Heliogen blue paint (Wyandotte's Grip Flex) had a VHIT of <10 in.-lbs.

EXAMPLE 10

This example illustrates a composition of the invention which includes plasticizer.

Example 2 is repeated except that the ratio of solution polymer to compatible polymer is 3:1 instead of 2:1, and is pigmented with TiO$_2$ in toluene and the mixture ground overnight to a Hegman fineness of grind reading of 7 to 8 units. The paste is thinned with more solution polymer, epoxidized soybean oil plasticizer, and enough xylene/toluene (50/50) to thin the mixture to a 15 second No. 4 Ford Cup viscosity. The paint had a pigment/binder ratio of 30/70 and a binder composition of 69 parts solution polymer, 14 parts compatible polymer, and 17 parts plasticizer.

The paint is sprayed on 0.125 inch Plexiglas 70, baked at 120° C. for 2 hours and tested to have VHIT Impact Strength (Paint in Tension) of >160 in.-lbs. whereas the uncoated control has a VHIT Impact Strength of 138 in.-lbs. The Microknife Adhesion 1/A is 0.26.

EXAMPLE 11

The same composition as Example 2 with methyl ethyl ketone as solvent instead of the aromatic solvent is pigmented with TiO$_2$ in pigment/binder ratio of 45:183 and thinned and spray painted on Plexiglas 70 sheet and baked at 180° for 30 minutes for a VHIT of 115 in.-lbs. versus 77 in.-lbs. for the uncoated sheet which is also baked for the same period for control purposes.

EXAMPLE 12

Example 3 is repeated, incorporating the following pigments at the following ratios, with very good results; lamp black, 7% based on solids; Toluidine Red, 17% based on solids; Monastral red, 15–20% based on solids; TiO$_2$ white, 50% based on solids. This shows varying pigment levels can be employed in this invention.

EXAMPLE 13

The following example illustrates another preparation of a compatible acrylic polymer having a Tg less than −20° F. and soluble in the solvent of the coating composition.

The ingredients to be charged in the reaction flask:

First Stage Charge 7950 ml deionized water
40 gms potassium carbonate
6480 gms n-butyl acrylate
32.4 gms 1,3-butylene glycol diacrylate
32.4 gms allyl methacrylate
325 gms 10% solution of sodium dodecyl benzene sulfonate Agitation is started, the temperature is adjusted to 75° C. and the emulsion sparged with nitrogen. The polymerization is initiated by addition of 160 ml. of 1% potassium persulfate. The reaction mixture is heated to 84° C. and an additional 490 ml. of 1% potassium persulfate are added. Thereafter, the following second stage ingredients are preemulsified and added gradually to reactive first-stage charge:

Second Stage Charge 1190 gms ethyl methacrylate
422 gms methyl acrylate
8 gms methacrylic acid
16.2 gms t-dodecyl mercaptan
80 gms 10% solution of sodium dodecyl benzene sulfonate
650 ml. DI water Accompanied with the second stage charge 160 ml. of 1% potassium persulfate are added.

The reaction mixture is held at 83–86° for an additional 1 hour. The latex at 45.6% solids had pH of 6.0.

EXAMPLE 14

This example illustrates the preparation of a coating composition of the invention using latex of Example 13. 1020 gms. of the latex of Example 13 are gradually added to 2602 gms. of solvent, such as n-butyl acetate, methyl isobutyl carbinol and cellosolve acetate. The water is distilled off at 65° C. under 250 mm pressure. 944.33 gms. of a conventional solution polymer copoly(ethyl methacrylate/methacrylate/methacrylic acid) 73/26/1 in a solvent which is mainly aromatic petroleum fraction boiling between 155–185° C. (Solvesso 100). The weight ratio of compatible acrylic polymer prepared as in accordance with Example 13 to the acrylic solution polymer is approximately 1:2.

I claim:

1. A composition for coating a substrate comprising an acrylic solution polymer polymerized from a monomer system comprising one or more lower alkyl methacrylates and acrylates and having a molecular weight of about 30,000 to 250,000 and a Tg above 65° F., a solvent therefor, and a compatible acrylic polymer having a Tg less than −20° F. comprising a poly(butyl acrylate), wherein the weight ratio of said acrylic solution polymer to said compatible acrylic polymer is about 10:1 to 1:10.

2. The composition of claim 1 wherein said compatible acrylic polymer comprises a poly(butyl acrylate) further including units derived from one or more monomers selected from the group consisting of alkoxyalkyl acrylates and alkylthioalkyl acrylates.

3. The composition of claim 1 wherein said compatible acrylic polymer comprises a poly(butyl acrylate) comprising a two-stage polymer having a first stage polymerized from a monomer system of butyl acrylate, methoxyethyl acrylate, cyanoethyl acrylate, and vinyl chloroacetate, and a second stage polymerized from a monomer system of ethyl acrylate and vinyl chloroacetate.

4. The composition of claim 1 wherein said compatible acrylic polymer comprises a poly(butyl acrylate) comprising a two-stage polymer having a first stage polymerized from a monomer system of butyl acrylate, 1,3-butylene glycol diacrylate and allyl methacrylate, and a second stage polymerized from a monomer system of ethyl methacrylate, methyl acrylate and methacrylic acid.

* * * * *